Figure 1:
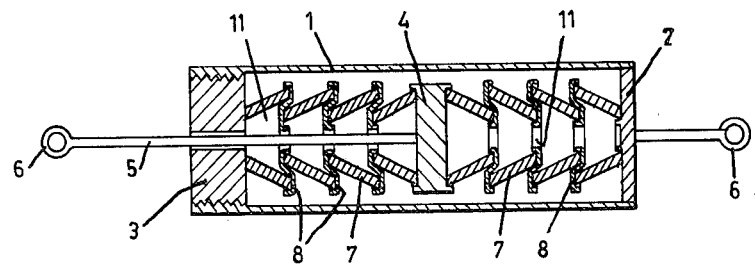

United States Patent [19]

Wiek

[11] 4,200,268
[45] Apr. 29, 1980

[54] SHOCK-ABSORBER

[76] Inventor: Eduard Wiek, 16 Horstlindelaan, Enschede, Netherlands

[21] Appl. No.: 915,878

[22] Filed: Jun. 15, 1978

[30] Foreign Application Priority Data

Jun. 17, 1977 [NL] Netherlands .................... 7706697
Dec. 23, 1977 [NL] Netherlands .................... 7714348

[51] Int. Cl.² .............................................. F16F 3/08
[52] U.S. Cl. .................................. 267/63 R; 267/152
[58] Field of Search ............ 188/268, 1 C; 267/22 R, 267/33, 35, 63 R, 64 B, 151, 152

[56] References Cited

U.S. PATENT DOCUMENTS

| | | | |
|---|---|---|---|
| 1,171,722 | 2/1916 | Hough | 267/22 X |
| 1,705,592 | 2/1929 | Paton | 267/63 R X |
| 1,731,412 | 10/1929 | Froesch | 267/63 R X |
| 1,864,080 | 6/1932 | Madge | 267/63 R |
| 2,678,796 | 5/1954 | Roy | 267/152 X |
| 3,053,526 | 9/1962 | Kendall | 267/63 R X |
| 3,276,763 | 10/1966 | Blatt | 267/64 B X |

FOREIGN PATENT DOCUMENTS 2104980 8/1971 Fed. Rep. of Germany .......... 267/152

Primary Examiner—Duane A. Reger
Attorney, Agent, or Firm—Schwartz, Jeffery, Schwaab, Mack, Blumenthal & Koch

[57] ABSTRACT

A shock absorber, e.g. for a motor vehicle, comprising a piston which is mobile in a cylinder and, at both sides of the piston, at least one shock absorbing body. The shock absorbing bodies are open at the topside and at the underside, and have the shape of an elliptic or polygonal section. The upper surface has a smaller section than the lower surface. Between the shock absorbing bodies circular metal discs with a central bore are provided. Each disc possesses an erect edge in which the big lower part of a shock absorbing body is enclosed sealingly on the metal disc. The space limited by the cylinder and the shock absorbing bodies with the metal discs is filled with a viscous liquid. Circumferential passageways for the liquid are present between the edges of the metal discs and the cylinder.

15 Claims, 4 Drawing Figures

SHOCK-ABSORBER

The invention relates to a shock absorber, e.g. for a motor vehicle, comprising a piston which is mobile in a cylinder.

Shock absorbers are generally known. The cylinder is filled with a liquid which, when shocks occur, is pressed through small holes, so that an absorbing action of these shocks occurs. Such a shock absorber has the drawback of a complicated construction, dissipation of resistance during a long unilateral load, such as when the vehicle takes a long turn, and failure up in case of a great shock force.

The purpose of the invention is to provide an improved shock absorber of simple construction.

The shock absorber according to the invention is characterized in that at least one shock absorbing body is provided at both sides of the piston. These shock absorbing bodies are made preferably of an elastic energy-absorbing material such as e.g. rubber of a type that has a great energy-absorbing power.

A favorable embodiment of the shock absorber according to the invention is characterized in that the shock absorbing bodies have the shape of a hollow open cone which is flattened off at the topside and underside. However, an elliptic or polygonal section is also possible.

A further favorable embodiment of the shock absorber according to the invention is characterized in that means are provided for giving an initial tension to the shock absorbing bodies.

The shock absorber according to the invention has the advantage of a simple construction. A further advantage is that no valve break-down can occur. Under an extra load a progressive reaction force occurs and thus a smooth ride is assured even when the vehicle is overloaded, whereas the reaction force always stays present, which is of particular importance when taking long curves.

A further favorable embodiment of the shock absorber according to the invention is characterized in that the means for giving the initial tension to the shock absorbing bodies are provided in such a way that the initial tension is situated in the middle of the stroke field of the piston.

This gives the advantage that in the upwards stroke the lowermost shock absorbing bodies do not come to lie loose, and vice versa. It is essential that both during the upwards and the downwards stroke energy is absorbed as from the beginning of the stroke.

Another favorable embodiment of the shock absorber according to the invention is characterized in that between the shock absorbing bodies circular metal discs with a central bore are provided. The discs also possess an erect edge in which the larger lower part of a shock absorbing body is enclosed. This gives the advantage that the underside of the hollow flattened off cone cannot be pressed away outwards and thus be pressed against the inner wall of the surrounding cylinder. The metal discs are provided with a central bulge, in which the small outer upper part of a shock absorbing body is enclosed, whereas the bulge is bent back around the central bore in such a way, that the thus created edge encloses the small upper part of the inside.

The shape of the metal discs which are used in the invention in combination with the chosen shape of the shock absorbing bodies gives the advantage that these bodies will bend outwardly when pressure is exerted thereon, so that they will not dent inwardly and press against the piston rod.

A further favorable embodiment of the shock absorber according to the invention is characterized in that the shock absorbing bodies are provided sealingly on the metal discs and that the space limited by the cylinder and the shock absorbing bodies with the metal discs is filled with a viscous liquid, whereas circumferential passageways are present between the edges of the metal discs and the cylinder.

By the to and fro movement of the viscous liquid especially through the circumferential passageways between the cylinder wall and the edges of the metal discs, an extra quantity of energy will be consumed, so that the energy absorbing action of the shock absorber will be increased.

In addition to the above described energy absorbing action, the presence of the viscous liquid also has the property of heat absorption. The heat developed by the shock absorbing bodies during the functioning of the shock absorber (by the hysteresis heat development in the used quality of the shock) is transferred by the liquid to the wall of the cylinder, where it is evacuated by convection and/or radiation. Thus the temperature of the shock absorber will rise less during its use and its life will be longer. The movement of the piston presses the liquid through the circumferential passageway between the wall of the cylinder on the one hand and the piston and the metal disc on the other hand, strongly increasing the absorption of the shock absorber as the liquid is be pressed along the plurality of discs. In case of heavy, rapid shocks the absorption is increased even more, because the liquid pressure on the shock absorbing bodies hampers the deformation thereof. Thus the invention gives the advantage that besides the favorable properties which are obtained with the rubber parts, the absorption can be increased strongly by the presence of the viscous liquid. Moreover, the absorption can be increased or diminished by varying the space between discs and cylinder on the one hand and the cylinder wall on the other hand. The absorption can also be increased or diminshed by varying the viscosity of the liquid.

It is observed that the use of a viscous liquid in shock absorbers is known in itself, such as e.g. in Koni shock absorbers. The drawback of these prior art absorbers is that any imperfections in the shape of the cylinder reduces the energy absorption very strongly. Thus the manufacture must be very accurate, which is complicated and expensive. Moreover, due to absence of rubber shock absorbing means, the shock absorbing function relies entirely upon liquid, which, when shocks occur, is pressed through small holes, to absorb the shocks. In addition to the drawback of a complicated construction, a deficiency in resistance occurs during a long unilateral load, such as during a long turn of the vehicle, or under a great shock force.

With the present invention, no accuracy is needed and a space of about one mm between the metal discs and the inner cylinder wall is sufficient, for proper operation so that all around a circumferential of a half mm is created. This, in contrasts with the sealing which is necessary with the known shock absorbers which function exclusively with liquid. In the shock absorber according to the invention, the liquid flows through the circumferential passageway all around so that a cascade effect is created. In the known shock absorbers, such as the Koni absorbers, the liquid must be pressed through one single channel, which is why this channel must be constructed very accurately.

A favorable embodiment of the shock absorber according to the invention is characterized in that the circumferential passageway width between the cylinder and the edge of the metal disc is chosen different, in such a way that the passageway which is closest to the piston is the widest, whereas the passageway width becomes smaller towards the cylinder ends. Thus the energy absorption which one wishes to obtain, can be varied even more.

Another favorable embodiment of the shock absorber according to the invention in characterized in that the space which is present at on one side, for example, the right side, of the piston and within the shock absorbing bodies and the fixing means is constructed as a closed space. This space will be compressed when the piston travels to the right, so that extra energy absorption will occur. In the movement to the left, after the central position has been passed, a vacuum will develop to again cause energy consumption, as this vacuum will have to be overcome in the further travel of the piston to the left. By filling this space with a gas under pressure further influence can be exterted on the energy absorbing character of the shock absorber. Further the closed off area may be connected by means of a channel provided in the cylinder with the space at the left side of the piston, so that a connection is present between this space and the atmosphere through the tolerance along the piston rod and the closing means, in case the above described extra energy absorbing action is not desired.

Another favorable embodiment of the shock absorber according to the invention is characterized in that the circumferential passageway between the metal discs and the cylinder is smaller at one side of the piston than at the other side of the piston, so that the inwards stroke and the outwards stroke of the piston give a different absorption.

A further favorable embodiment of the shock absorber according to the invention is characterized in that the shock absorbing body which lies against the closing means (a cylinder tube) is mounted sealingly thereto. This offers the advantage that the shaft of the piston need not be mounted sealingly. The sealing of the piston is a vulnerable point in the known liquid shock absorbers.

In this way a shock absorber has been obtained which shows an adjustable conduct with respect to a desired energy absorption by either adjusting the quantity of viscous liquid in the space between shock absorbing bodies and cylinder wall, or by adjusting the gas pressure in the closed off space at the right side of the piston and within the shock absorbing bodies.

Figure 2:
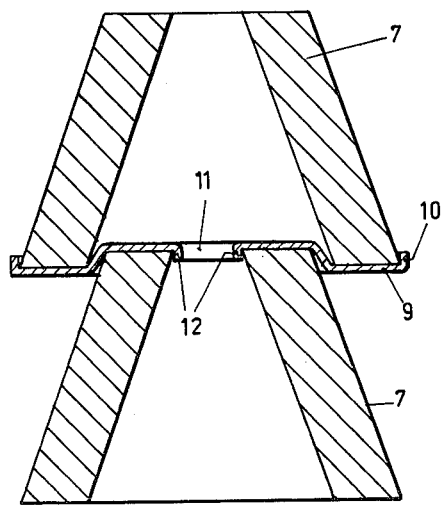
Figure 3:
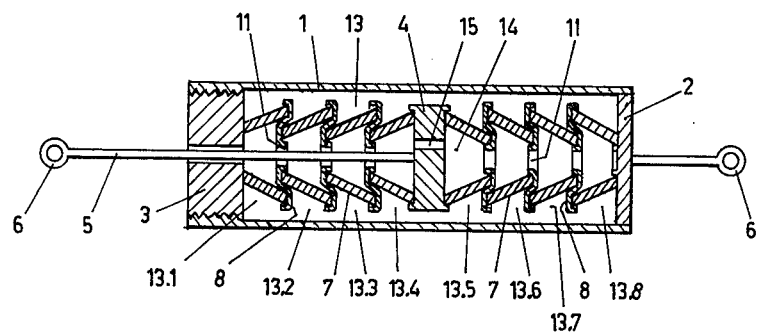
Figure 4:
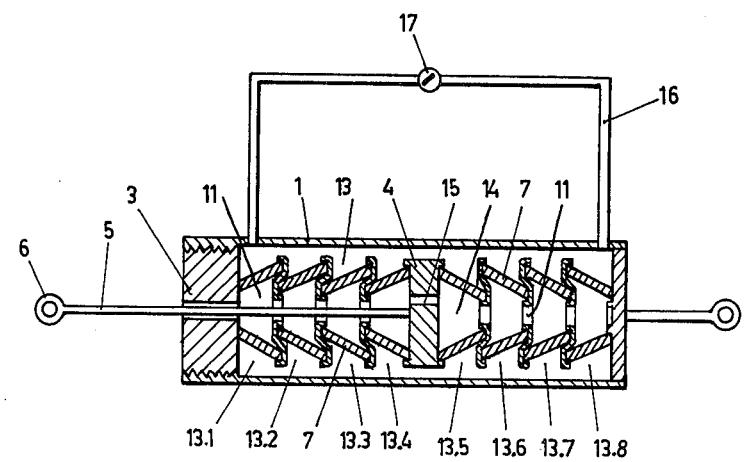

The invention will be explained hereinafter with reference to the drawing in which, by means of example, some embodiments of the shock absorber according to the invention are shown. In the drawing:

FIG. 1 shows a longitudinal section of the shock absorber according to the invention, FIG. 2 shows a longitudinal section of two shock absorbing bodies and a metal disc provided between them, FIG. 3 shows a longitudinal section of another embodiment of the shock absorber according to the invention, and FIG. 4 shows a longitudinal section of a shock absorber according to the invention, provided with a bypass line.

In FIG. 1 the reference number 1 indicates a cylinder provided with a fixing means 2 at the one side and a screw-thread at the other side on which a threaded closing means 3 is provided. The cylinder has a piston 4 which by means of a piston rod 5 is connected with a fixing means 6. According to the invention, the piston is not a sealingly fitting piston, but rather is a mobile center supporting plate. At both sides of the piston 4 there are rubber shock absorbing bodies. The shock absorbing bodies have the shape of a flattened off hollow cone. In the drawing the shock absorbing bodies 7 at both sides of the piston 4 are shown in opposite direction, but this is not necessary: they may also be oriented in the same direction. Between the shock absorbing bodies are provided metal discs 8, of which one in shown in section in FIG. 2. In the assembly of the shock absorber according to the invention the shock absorbing bodies 7 protrude out of the cylinder before the closing means 3 is tightened by means of the screw-thread, so that the initial tension can be set when the closing means is tightened. In a favorable way the initial tension is set in such a way, that it lies in the middle of the stroke field of the piston. The number of shock absorbing bodies that are employed, depends on the stroke that must be reached. Per application (load, desired stroke) a shock absorber can be designed which has the desired properties. The shock absorbing action in the shock absorber according to the invention is based on energy consumption by conversion of kinetic energy into heat when the shock absorbing bodies 7 are subject to impact. The deformation of the shock absorbing bodies causes a resilient force which is small with respect to the impacting force. Thus very good absorbing properties are obtained with the construction according to the invention. The greater the stroke, the more energy is absorbed.

In FIG. 2 the reference number 9 indicates a metal disc, which has erect edges 10, which in practice may be about 2 mm long. In the middle of the metal disc 1 bulge 11 is provided, whereas the edge around the central bore is bent back in such a way, that an edge 12 is formed and encloses the small upper part of the inside of the shock absorbing body 7. As shown in FIG. 2 from the shape of the metal disc 9, the shock absorbing bodies 7 are enclosed at their topside and underside in such a way that bending outwards and inwards is impossible. The hollowness is necessary to enable the deforming of the wall, whereas the inclination of the cone is chosen to obtain an outwards deformation, because otherwise the deformation would interfere with movement of the shaft. By variation of the thickness of the wall and by the choice of the material, shock absorbing bodies with different absorbing properties can be obtained, which can be taken into account in the design of different types of shock absorbers for different types of vehicles.

In FIG. 3 the reference number 1 indicates a cylinder provided with a fixing means 2 at the one side and a screw-thread at the other side on which a threaded closing means 3 is provided. In the cylinder there is a piston 4 which by means of a piston rod 5 is connected with a fixing means 6. The piston piston, is not a sealingly fitting piston, but rather a mobile center supporting plate. Rubber shock absorbing bodies are provided at both sides of the piston 4 shock absorbing bodies have the shape of a flattened off hollow cone. In the drawing the shock absorbing bodies 7 at both sides of the piston 4 are shown in opposite direction, this is not necessary: the shock absorbing bodies 7 may also be oriented in the same direction. Between the shock absorbing bodies are provided metal discs 8, a cross section is shown in FIG. 2. In the assembly of the shock absorber according to the invention, the shock absorbing bodies 7 protrude beyond the cylinder before the closing means 3 is tightened by means of the screw-thread, so that the desired initial tension can be set when the closing means is tightened. In a favorable way the initial tension is set in such a way that it lies in the middle of the stroke field of the piston. The number of shock absorbing bodies that must be piled, depends on the stroke that must be reached. Per application (load, desired stroke) a shock absorber can be designed which has the desired properties. The shock absorbing action in the shock absorber according to the invention is based on energy consumption by conversion of kinetic energy into heat when the shock absorber bodies undergo deformation. This deformation in correlation wth the chosen material quality causes a resilient force which is small with respect to the impacting force. Thus excellent absorbing properties are obtained with the construction according to the invention. The greater the stroke, the more energy is absorbed.

In FIG. 3, the space 13 situated between the cylinder 1 and the shock absorbing bodies 7 with their fixing means 2,3 and 8 is filled with a viscous liquid, so that the to and fro movement of the piston 4 causes an extra flow in the viscous liquid. The shock absorber according to the invention works as follows: suppose that the piston 4 in FIG. 3 travels to the left, then the liquid in the space 13 will travel from the left part of the space 13 to the right part of that space. In this movement the viscous liquid will be pressed through the spaces which are present between the cylinder wall 1 and the outer edge of the metal discs 8 with erect edge 10. To accurately follow this movement and to have a better understanding of the invention, the space 13 is thought to be divided into a number of compartments, each limited by the cylinder 1 at the one side and one of the shock absorbing bodies 7 with its metal discs 8 at the other side. In FIG. 3, where a shock absorber with eight shock absorbing bodies 7 is shown, the space 13 is thus divided into 8 compartments. These space sections can be numbered from left to right as 13.1, 13.2, 13.3 etc. to 13.8. If the piston 4 travels to the left, the spaces 13.1 through 13.4 are compressed and the spaces 13.5 through 13.8 are enlarged. The space 13.1 e.g. will be reduced by a volume V. If the impacts of the shock absorbing bodies 7 left of the piston 4 are all equal, then each space 13.1 through 13.4 shall be reduced by an equal volume V. This has the consequence that at the space 13.1 a volume V must be pressed between the cylinder 1 and the disc 8 with erect edge 10. However, also the space 13.2 must be reduced by a volume V. As a volume V is pressed from the space 13.1 into the space 13.2, a volume 2V must be pressed from this space into the space 13.3. As this space is reduced too at its turn by one volume V, a volume 3V must be pressed into the space 13.4. By this same cascade principle a volume 4V will be pressed around the piston 4 to the space 13.5 at the right side of the piston 4. This space, however, shall be increased by the same volume V when the piston 4 travels to the left. But as a quantity of liquid 4V is pressed from the space 13.4 into the space 13.5, only a volume 3V will be pressed into the space 13.6. And, according to said cascade principle, a volume of respectively 2V and 1V will be pressed into the spaces 13.7 and 13.8. When the piston 4 travels again from its extreme position, caused by the movement to the left, to the right, the above-described process will take place in the opposite direction.

By the to and fro travelling of the viscous liquid and its being pressed between the circumferential passageway between cylinder wall 1 and the erect edges 10, an extra quantity of energy will be consumed, so that the energy absorbing action of the shock absorber will be increased.

Besides the above-described energy absorbing action, the presence of the viscous liquid also has the property that heat, which is developed by the shock absorbing bodies 7 during the functioning of the shock absorber by the hysteresis heat development in the chosen quality of the buffer, is transferred to the wall of the cylinder 1. The heat then escapes by convection and/or radiation. Thus the temperature of the shock absorber will rise less during its use and its life will be prolonged.

A further possibility of this invention is that the size of the circumferential passageway between the cylinder 1 and the erect edge 10 of the disc 8 can be increased or reduced, according to the energy absorption desired. However, it will always be possible to choose the size of the circumferential passageway with a wide tolerance, so that no precision fitting or dimension accuracies of smaller than 0.1 mm are necessary. A normal size of the circumferential passageway will be about 0.5 mm. If so desired, the circumferential passageway width can also be adapted to the quantity of liquid to be displaced, so that the circumferential passageway closest to the piston 4 will also be the greatest. As the space 13 is completely closed off at all sides, leakage of the viscous liquid is impossible. Also by filling the space 13 entirely or only partly with viscous liquid, influence can be exerted on the energy absorbing character of the shock absorber.

Another possibility to influence this energy absorbing conduct of the shock absorber is given by making use of the compression of the air in the space 14, which is situated at the right side of the piston 4 in FIG. 3 and within the shock absorber bodies 7 and the fixing means 2. This space too is closed off completely. If the piston 4 travels to the right, the space will be compressed, so that extra energy absorption will occur. When the piston travels to the left and has passed the central position, a vacuum can occur in the space 14, which again will cause energy destruction, as this vacuum will have to be overcome when the piston 4 travels further to the left. By filling the space 14 with a gas under pressure, influence can be exterted on the energy absorbing character of the shock absorber. If desired so, the space 14 can be connected by a channel to be provided in the piston 4 with the space at the left side of the piston 4 in FIG. 3, so that this space 14 through the clearance between the piston rod 5 and the closing means 3 then comes in open connection with the atmosphere, so that the above described energy absorbing action need not occur.

FIG. 4 shows an embodiment of the shock absorber according to the invention, where use is made of the possibility to provide a bypass line 16 with adjusting valve 17. This bypass line 16 connects the two ends of the absorber in such a way that the oil is given the possibility to flow from the compressed compartment to the expanded compartment with a very small pressure drop. Hereby the cascade effect is partly reduced, so that the flexibility of the absorber is increased. By means of the adjusting valve 17 the degree of increasing the flexibility of the absorber can be adjusted. Thus it becomes possible to adjust also the energy absorption of the absorber. The absorber obtained, becomes adjustable for both high energy absorption, for a heavy load of the vehicle, and low energy absorption, for a small load of the vehicle. If desired so, the adjusting valve 17 can be set at the desired position by remote control.

It will be obvious that the invention is not restricted to the above described embodiments, but that numerous modifications are possible, all within the scope of the invention.

I claim:

1. A shock absorber comprising a piston centrally and moveably positioned in a cylinder, a plurality of conically shaped deformable shock absorbing bodies located about the central longitudinal axis of said cylinder on each side of said piston and a plurality of circular non-deformable dics each disc being arranged between two of said conically shaped shock absorbing bodies.

2. The shock absorber of claim 1 characterized in that the shock absorbing bodies have the shape of a hollow open cone which is flattened off at the topside and at the underside.

3. The shock absorber of claim 1 characterized in that the shock absorbing bodies are open at the topside and at the underside, and have the shape of an elliptic or polygonal section, whereas the topside surface has a smaller section than the underside surface.

4. The shock absorber of claim 1 characterized in that means are provided for giving an initial tension to the shock absorbing bodies.

5. The shock absorber according to claim 4, characterized in that the means for giving the initial tension to the shock absorbing bodies are provided in such a way, that the initial tension lies in the middle of the stroke field of said piston.

6. The shock absorber of claim 1 characterized in that between the shock absorbing bodies circular metal discs with a central bore are provided, which are provided with an erect edge in which the big lower part of a shock absorbing body is enclosed.

7. The shock absorber according to claim 6, characterized in that the metal discs are provided with a central bulge, in which the small outer upper part of a shock absorbing body is enclosed, whereas the bulge is bent back around the central bore in such a way, that the thus formed edge encloses the small upper part of the inside.

8. The shock absorber of claim 6 characterized in that the shock absorbing bodies are sealed to the metal discs and that the cylinder is filled with a viscous liquid, and circumferential passageways are present between the outer edges of the metal discs and the inner surface of said cylinder.

9. The shock absorber according to claim 8, characterized in that the circumferential passageway width between the cylinder and the edge of each metal disc is chosen different, in such a way that the circumferential passageway which is closest to the piston 4 is the greatest, whereas the circumferential passageway width becomes smaller towards the cylinder ends.

10. The shock absorber according to claim 1, characterized in that the shock absorbing bodies immediately adjacent one side of the piston is sealed to form a closed off space.

11. The shock absorber according to claim 10, characterized in that the closed off space is filled with a gas under pressure.

12. The shock absorber according to claim 10, characterized in that the closed off space is connected by means of a channel in the piston with a space at the other side of the piston.

13. The shock absorber of claim 8 characterized in that the circumferential passageways between the metal discs and the cylinder are smaller at one side of the piston than at the other side of the piston, so that the inwardly stroke and the outwardly stroke of the piston give a different absorption.

14. The shock absorber of claim 1 characterized in that one of the shock absorbing bodies is mounted sealingly against the ends of said cylinder.

15. The shock absorber of claim 8 characterized in that a bypass line with adjusting valve extends between the two ends of the absorber to provide a conduit through which the viscous liquid in one end of the cylinder can pass to the other end of the conduit.

* * * * *